United States Patent
Iyoda et al.

(10) Patent No.: US 7,228,217 B2
(45) Date of Patent: Jun. 5, 2007

(54) ROLL OVER DETECTOR FOR A VEHICLE

(75) Inventors: Motomi Iyoda, Seto (JP); Hideyuki Usui, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 562 days.

(21) Appl. No.: 10/885,002

(22) Filed: Jul. 7, 2004

(65) Prior Publication Data

US 2005/0033496 A1 Feb. 10, 2005

(30) Foreign Application Priority Data

Jul. 22, 2003 (JP) ............................. 2003-200028

(51) Int. Cl.
  *G06F 19/00* (2006.01)
(52) U.S. Cl. .................... 701/70; 340/429; 340/440; 280/755
(58) Field of Classification Search .................. 701/1, 701/70; 340/429, 440; 280/755
See application file for complete search history.

(56) References Cited

U.S. PATENT DOCUMENTS

| | | | |
|---|---|---|---|
| 6,433,681 B1* | 8/2002 | Foo et al. ................. 340/440 |
| 6,535,800 B2* | 3/2003 | Wallner .................... 701/1 |
| 6,542,073 B2* | 4/2003 | Yeh et al. ................. 340/440 |
| 6,600,414 B2* | 7/2003 | Foo et al. ................. 340/440 |
| 6,654,671 B2* | 11/2003 | Schubert .................. 701/1 |
| 6,694,225 B2* | 2/2004 | Aga et al. ................. 701/1 |
| 2002/0075140 A1 | 6/2002 | Yeh et al. |
| 2005/0159872 A1* | 7/2005 | Geborek et al. ........... 701/70 |

FOREIGN PATENT DOCUMENTS

| | | |
|---|---|---|
| DE | 101 64 332 A1 | 9/2002 |
| EP | 1 270 337 A2 | 1/2003 |
| EP | 1 312 515 A1 | 5/2003 |
| JP | A-2001-074442 | 3/2001 |
| JP | A 2002-200951 | 7/2002 |

\* cited by examiner

*Primary Examiner*—Gary Chin
(74) *Attorney, Agent, or Firm*—Oliff & Berridge, PLC

(57) ABSTRACT

A roll over detector for a vehicle is disclosed, which includes a roll over phenomenon detecting circuit that detects a roll over phenomenon of the vehicle based on a relationship between at least a type of physical quantity representative of a roll state of the vehicle and a predetermined threshold; a reacting roll phenomenon detecting circuit that detects a reacting roll phenomenon of the vehicle based on a predetermined criterion, which reacting roll phenomenon occurs in reaction to the roll phenomenon in an opposite direction; and a threshold changing circuit that changes the predetermined threshold from a first threshold to a second threshold so that the roll over phenomenon becomes difficult to be detected by the roll over phenomenon detecting circuit if the reacting roll phenomenon is detected by the reacting roll phenomenon detecting circuit.

18 Claims, 11 Drawing Sheets

| THIRD QUADRANT REACTING ROLL DETERMINATION RESULT | FIRST QUADRANT REACTING ROLL DETERMINATION RESULT | DETERMINATION RESULTS TO BE SELECTED |
|---|---|---|
| FALSE | FALSE | A&B |
| FALSE | TRUE | B&C |
| TRUE | FALSE | D&A |

ROLL OVER DETECTOR FOR A VEHICLE

TECHNICAL FIELD

The present invention relates to a roll over detector for use in a vehicle, which determines whether the roll over phenomenon of the vehicle occurs.

BACKGROUND ART

A roll over detector as described in the opening paragraph is known from JP 2002-200951 A, in which a type of roll over phenomenon of a vehicle is identified based on a roll rate and a lateral acceleration and then a threshold for detecting a roll over phenomenon is changed according to the identified type of roll over phenomenon. With this known roll over detector, since the threshold can be adapted to the respective types of roll over phenomena, it is possible to improve the accuracy of detection of the roll over phenomenon.

By the way, of the actual phenomena that occur when the vehicle rolls, there is a reacting roll phenomenon. The reacting roll phenomenon occurs when the vehicle rolls largely in one direction but doesn't roll over, restores to its horizontal state and then rolls in an opposite direction in reaction to the roll phenomenon in one direction. For this reason, the threshold for detecting a roll over phenomenon must be set so as not to react to this reacting roll phenomenon. In connection with this, in the known roll over detector, since the threshold for detecting a roll over phenomenon is changed without considering the reacting roll phenomenon, there is a possibility that the threshold for detecting a roll over phenomenon might be exceeded when the reacting roll phenomenon occurs. On the other hand, if the threshold is set high enough not to react to the reacting roll phenomenon, it leads to a delay in detection when the roll over phenomenon actually occurs.

DISCLOSURE OF INVENTION

It is an object of the present invention to provide a roll over detector for a vehicle that can detect a roll over phenomenon in consideration of a reacting roll phenomenon.

In order to achieve the above-mentioned objects, according to one aspect of the present invention a roll over detector for a vehicle is provided, comprising: a roll over phenomenon detecting circuit that detects a roll over phenomenon of the vehicle based on a relationship between at least a type of physical quantity representative of a roll state of the vehicle and a predetermined threshold; a reacting roll phenomenon detecting circuit that detects a reacting roll phenomenon of the vehicle based on a predetermined criterion, which reacting roll phenomenon occurs in reaction to the roll phenomenon in an opposite direction; and a threshold changing circuit that changes the predetermined threshold from a first threshold to a second threshold if the reacting roll phenomenon is detected by the reacting roll phenomenon detecting circuit.

In this aspect of the present invention, the detection by the roll over phenomenon detecting circuit may be based on the predetermined thresholds prepared for each direction in which the vehicle rolls, and the threshold changing circuit may change the predetermined threshold corresponding to a restoring direction in which the reacting roll phenomenon is detected to occur. Further, the threshold changing circuit may change the predetermined threshold corresponding to the other direction opposite to the restoring direction in consideration of the secondary reacting roll phenomenon. In any case, the threshold changing circuit may change the predetermined threshold so that the roll over phenomenon becomes difficult to be detected by the roll over phenomenon detecting circuit.

Further, the reacting roll phenomenon detecting circuit may detect the reacting roll phenomenon if an absolute value of a roll angle exceeds a certain value and then falls below the certain value, and the threshold changing circuit may further change the predetermined threshold, which has been changed to the second threshold, in a direction toward the first threshold after the expiration of a predetermined time interval which starts at the time when the absolute value of the roll angle falls below the certain value. Alternatively, the reacting roll phenomenon detecting circuit may detect the reacting roll phenomenon if an absolute value of a roll angle exceeds a first predetermined value, a polarity of a roll rate reverses and then an absolute value of the roll rate exceeds a second predetermined value, and the threshold changing circuit may further change the predetermined threshold, which has been changed to the second threshold, in a direction toward the first threshold when the absolute value of the roll rate falls below the second predetermined value. In any case, the threshold changing circuit may change the second threshold directly to the first threshold, or change the second threshold to the first threshold step by step via an other intermediate threshold.

In order to achieve the above-mentioned objects, according to one aspect of the present invention a roll over detector for a vehicle is provided, comprising: a roll over phenomenon detecting circuit that detects a roll over phenomenon of the vehicle based on a relationship between at least a type of physical quantity representative of a roll state of the vehicle and a predetermined threshold; a reacting roll phenomenon detecting circuit that detects a reacting roll phenomenon of the vehicle based on a predetermined criterion, which reacting roll phenomenon occurs in reaction to the roll phenomenon in an opposite direction; and a prohibition circuit that prevents the roll over phenomenon from being detected in a restoring direction if the reacting roll phenomenon is detected by the reacting roll phenomenon detecting circuit.

In this aspect of the present invention, the prohibition circuit may further prevent the roll over phenomenon from being detected in the other direction opposite to the restoring direction in consideration of the secondary reacting roll phenomenon.

In any of the above-mentioned aspects of the present invention, the reacting roll phenomenon detecting circuit may detect the reacting roll phenomenon based on at least a roll rate. Further, the reacting roll phenomenon detecting circuit may detect the reacting roll phenomenon based on at least a roll rate and a roll angle. For example, the reacting roll phenomenon may be detected if an absolute value of a roll angle exceeds a certain value and then falls below the certain value. Alternatively, the reacting roll phenomenon may be detected if an absolute value of a roll angle exceeds a certain value and then a polarity of the roll rate reverses.

Other objects, features and advantages of the present invention will become more apparent from the following detailed description when read in conjunction with the accompanying drawings.

BEST MODE FOR CARRYING OUT THE INVENTION

Hereafter, the preferred embodiments according to the present invention are explained with reference to the drawings.

Figure 1:
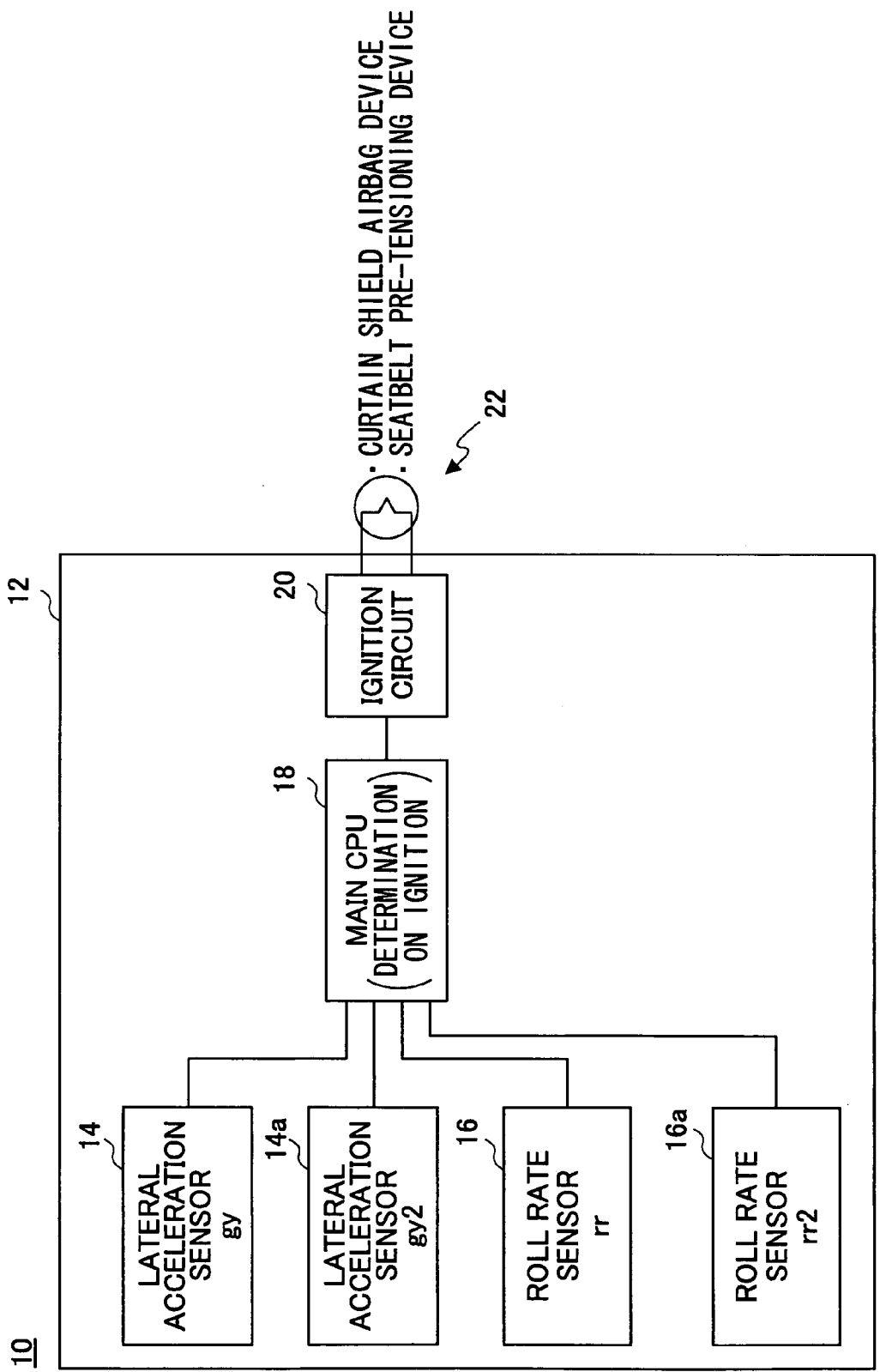
FIG. 1 is a block diagram showing an embodiment of a system configuration of a roll over detector according to the present invention.

FIG. 1 shows an embodiment of a system configuration of a roll over detector according to the present invention. The roll over detector 10 is mainly comprised of an ECU (electronic control unit) 12 that manages control over a passenger safety device 22 such as an airbag device. The functions of the roll over detector 10, however, may be implemented in another ECU or a microcomputer dedicated to the special purpose.

As shown in FIG. 1, into the ECU 12 are incorporated a lateral acceleration sensor 14 for sensing an acceleration acting on the vehicle in a lateral direction (a width direction of the vehicle), and a roll rate sensor 16 for sensing an angular rate in a roll direction. The output signals gy and rr of the lateral acceleration sensor 14 and the roll rate sensor 16, respectively, are input to a CPU 18 of the ECU 12. The CPU 18 determines whether a roll over phenomenon is detected based on the output signals gy and rr of the lateral acceleration sensor 14 and the roll rate sensor 16. When detecting the roll over phenomenon, the CPU 18 sends a control signal to a driving (ignition) circuit 20 to drive the passenger safety devices 22 such as a curtain shield airbag device or a seatbelt pre-tensioning device. It should be understood that the passenger safety devices 22 include any safety devices that are activated at the time of the roll over phenomenon.

Figure 2:
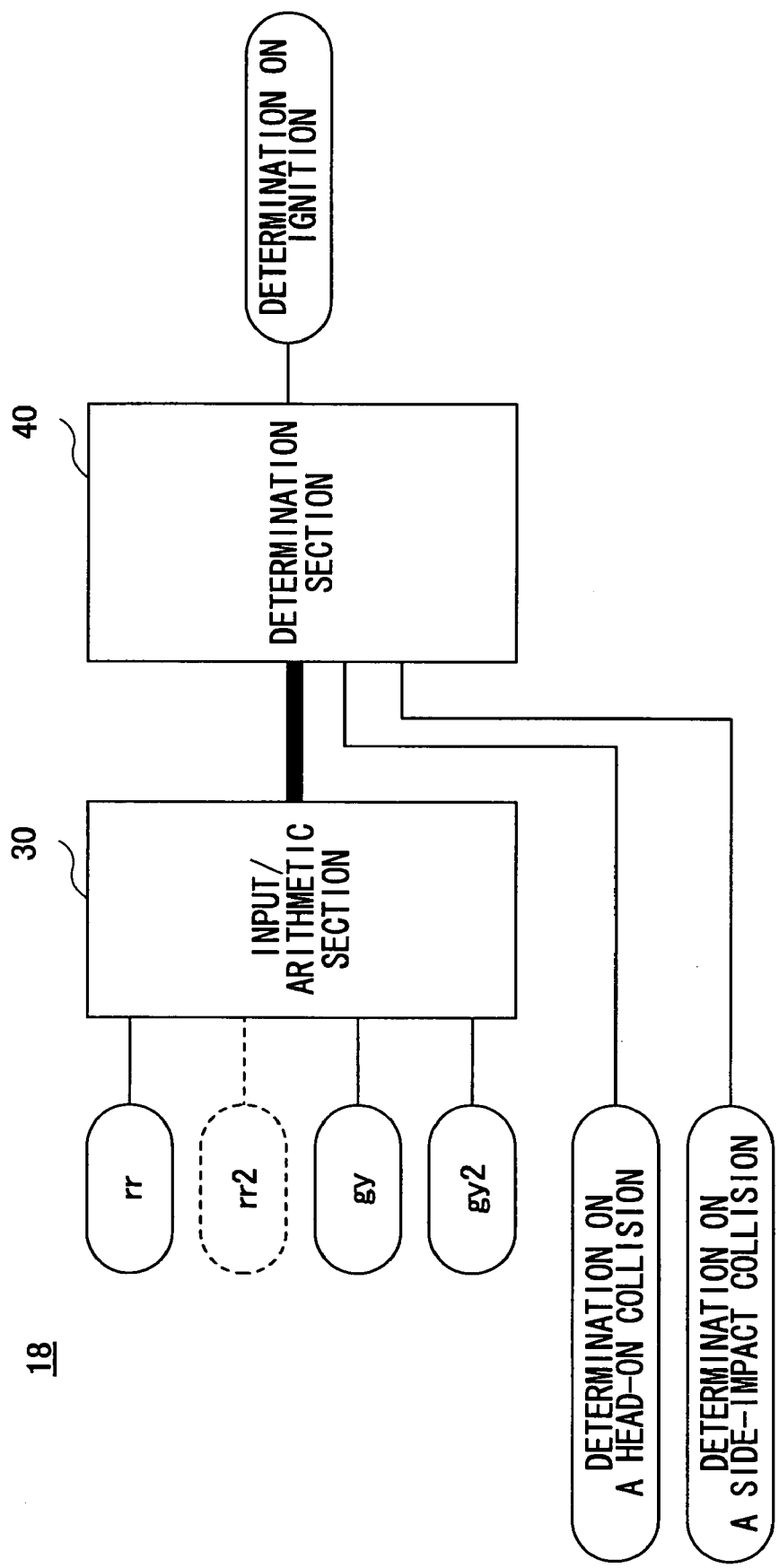
FIG. 2 is a block diagram of the CPU 18.

FIG. 2 is a block diagram of the CPU 18. The CPU 18 mainly includes an input/arithmetic section 30 and a determination section 40. To the input/arithmetic section 30 are input the output signal rr of the roll rate sensor 16 and the output signal gy of the lateral acceleration sensor 14.

Figure 3:
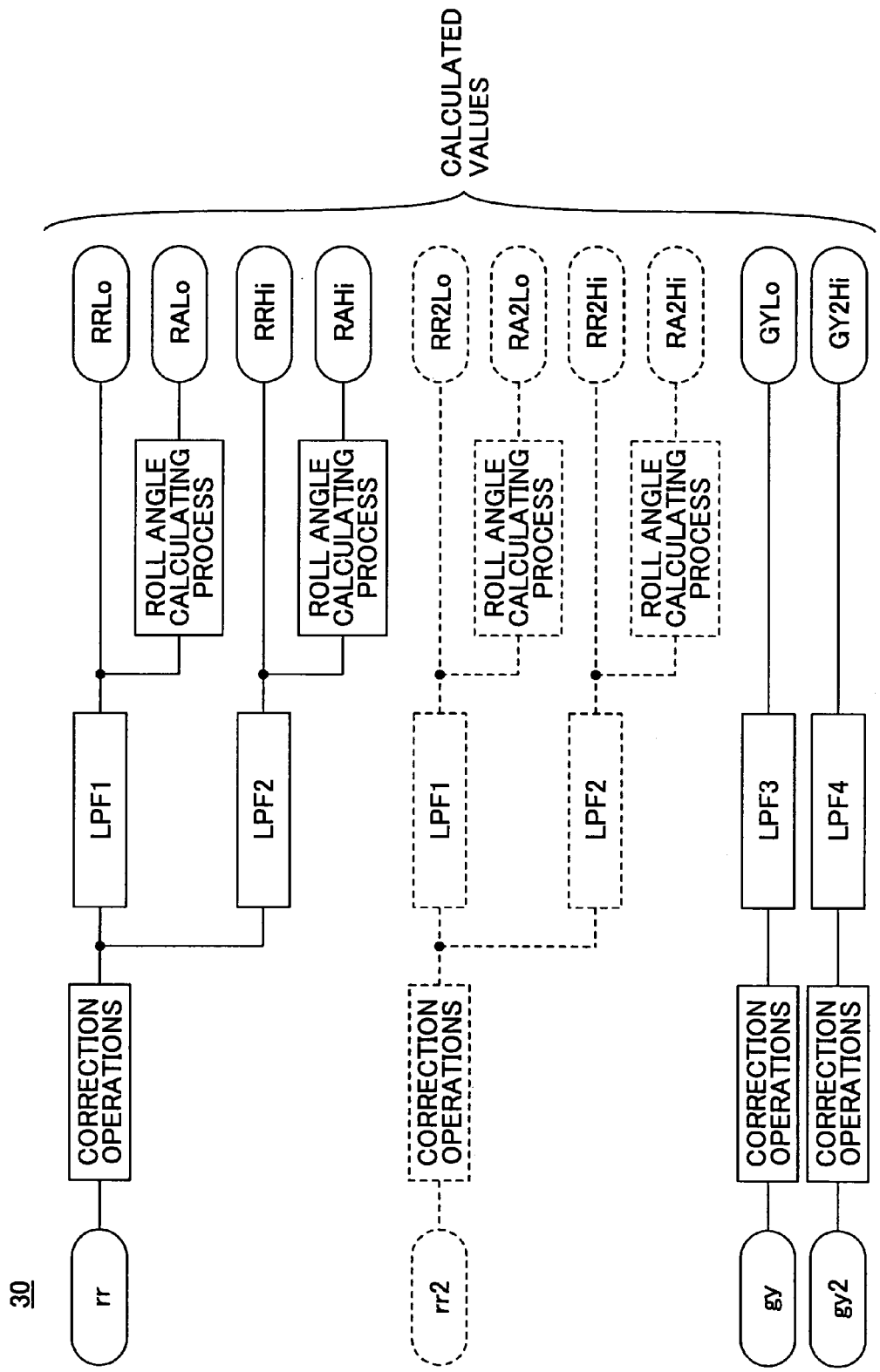
FIG. 3 is a block diagram of the input/arithmetic section 30.

FIG. 3 is a block diagram of the input/arithmetic section 30. As shown in FIG. 3, the output signal rr of the roll rate sensor 16 is subjected to operations such as an analog-to-digital sampling, a zero point correction and an input range limitation, and then is passed through a low-pass filter LPF1 (filtering out high frequency components). The output signal rr, after having undergone these operations, is output as a roll rate RR and used to calculate a roll angle RA. Similarly, the output signal gy of the lateral acceleration sensor 14 is subjected to the appropriate operations including a filtering operation through a low-pass filter LPF3 and is output as a lateral acceleration GY. However, it should be understood that variants of operations by the input/arithmetic section 30 can be contemplated and the present invention is not limited to the above-mentioned way of obtaining a roll rate RR and a roll angle RA.

Figure 4:
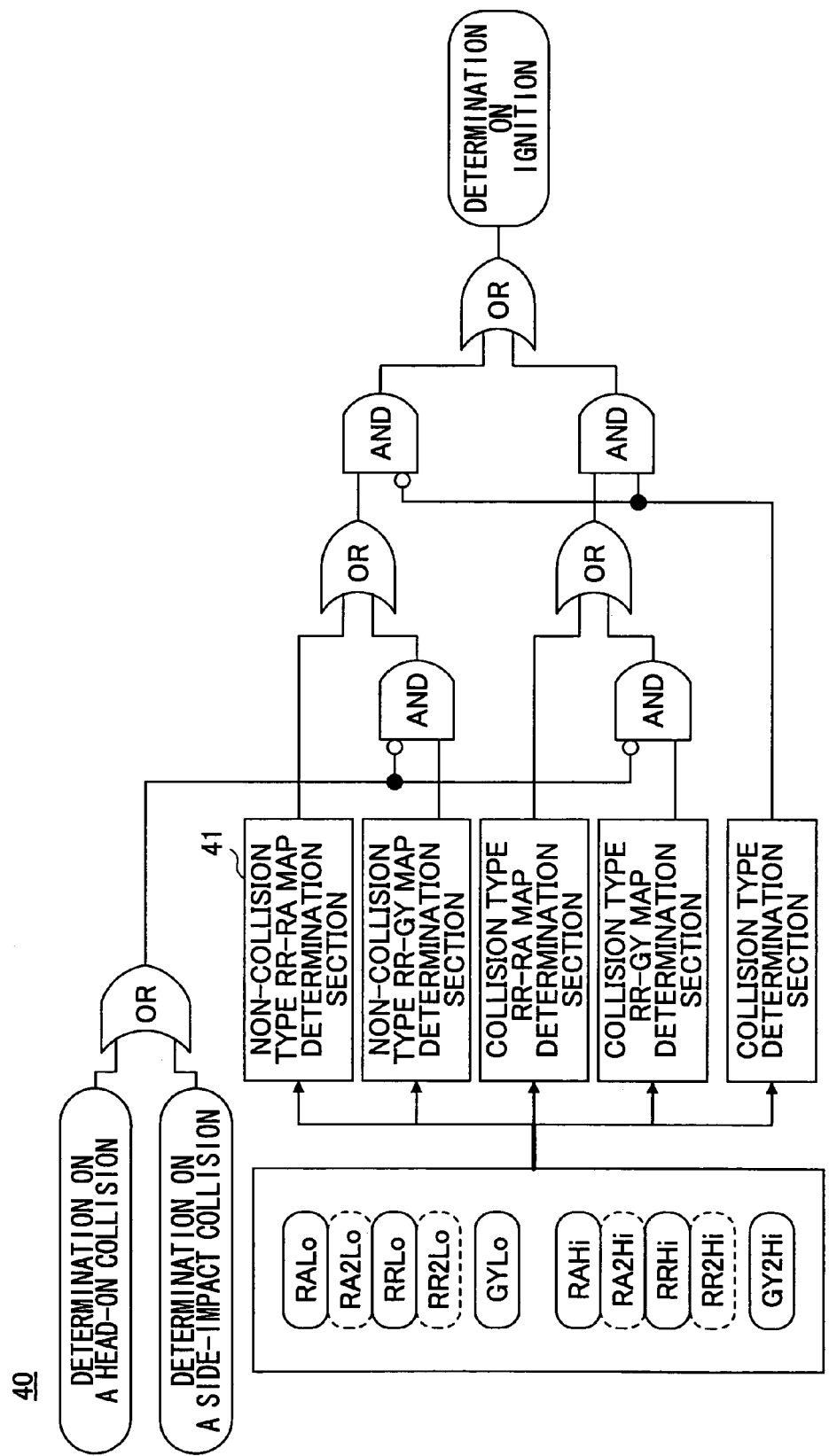
FIG. 4 is a block diagram of the determination section 40.

FIG. 4 is a block diagram of the determination section 40. The determination section 40 makes a determination whether a roll over phenomenon of the vehicle is detected using the roll rate RR, the roll angle RA and the lateral acceleration GY calculated by the input/arithmetic section 30. Specifically, the determination section 40 makes the roll over determination by independently (simultaneously) using roll over determination maps defined by a relationship between a roll rate RR and a roll angle RA, hereafter referred to as "a RR-RA map", and roll over determination maps defined by a relationship between a roll rate RR and a lateral acceleration GY, hereafter referred to as "a RR-GY map", as shown in FIG. 4.

Further, two types of maps may be prepared for each the RR-RA map and the RR-GY map. In this case, 4 types of determination maps are prepared as a result. In the particular embodiment illustrated by FIG. 4, collision type RR-RA map and RR-GY map are prepared to be used under circumstance where a collision occurs, and non-collision type RR-RA map and RR-GY map are prepared to be used under circumstance where no collision occurs. It is noted that the term collision doesn't refer to collisions involving relatively high acceleration such as a head-on collision or a side-impact collision between vehicles, but refers to a collision involving relatively low acceleration (i.e., about 2-3 G), such as a collision when a wheel of the vehicle comes into contact with a curbstone of the roadway as a result of the vehicle having slid sideways.

Accordingly, different calculated values (a roll rate RR, a roll angle RA and a lateral acceleration GY) may be used for the collision type determination maps and the non-collision type determination maps. For example, as shown FIG. 1, in addition to the lateral acceleration sensor 14 for detecting a relatively low acceleration generated by the non-collision events, a separate lateral acceleration sensor 14a may be provided for detecting a relatively high acceleration generated by the collision events. In this case, at the input/arithmetic section 30 the output signal gy2 of the lateral acceleration sensor 14a may be subjected to a filtering operation by a low-pass filter LPF4 with a high cut-off frequency. Similarly, a roll rate RR and a roll angle RA for collision and non-collision type determination maps may be separately derived through different operations (such as a low-pass filter LPF2 with a high cut-off frequency) or the same operations as shown in FIG. 3.

Hereafter, a roll rate RR, a roll angle RA and a lateral acceleration GY calculated for non-collision type determination maps are specified by a reference symbol "Lo" and a roll rate RR, a roll angle RA and a lateral acceleration GY calculated for collision type determination maps are specified by a reference symbol "Hi". For example, a roll rate RRLo indicates the roll rate calculated for a non-collision type RR-RA map.

It is noted that a head-on collision or a side-impact collision between vehicles may be detected through predetermined determination procedures conducted separately by the CPU 18. The determination section 40 illustrated in FIG. 4 is switched by the determination result of a head-on collision or a side-impact collision. The determination section 40 validates the determination results obtained from the collision and non-collision type determination maps only if neither head-on collision nor side-impact collision is detected, as shown in FIG. 4. The result obtained at the detection of a head-on collision and a side-impact collision may be held to be effective for a predetermined duration of time.

Hereafter, a non-collision type RR-RA map determination section 41 of the determination section 40 is described in detail, as the present invention mainly relates to a non-collision type RR-RA map.

Figure 5:
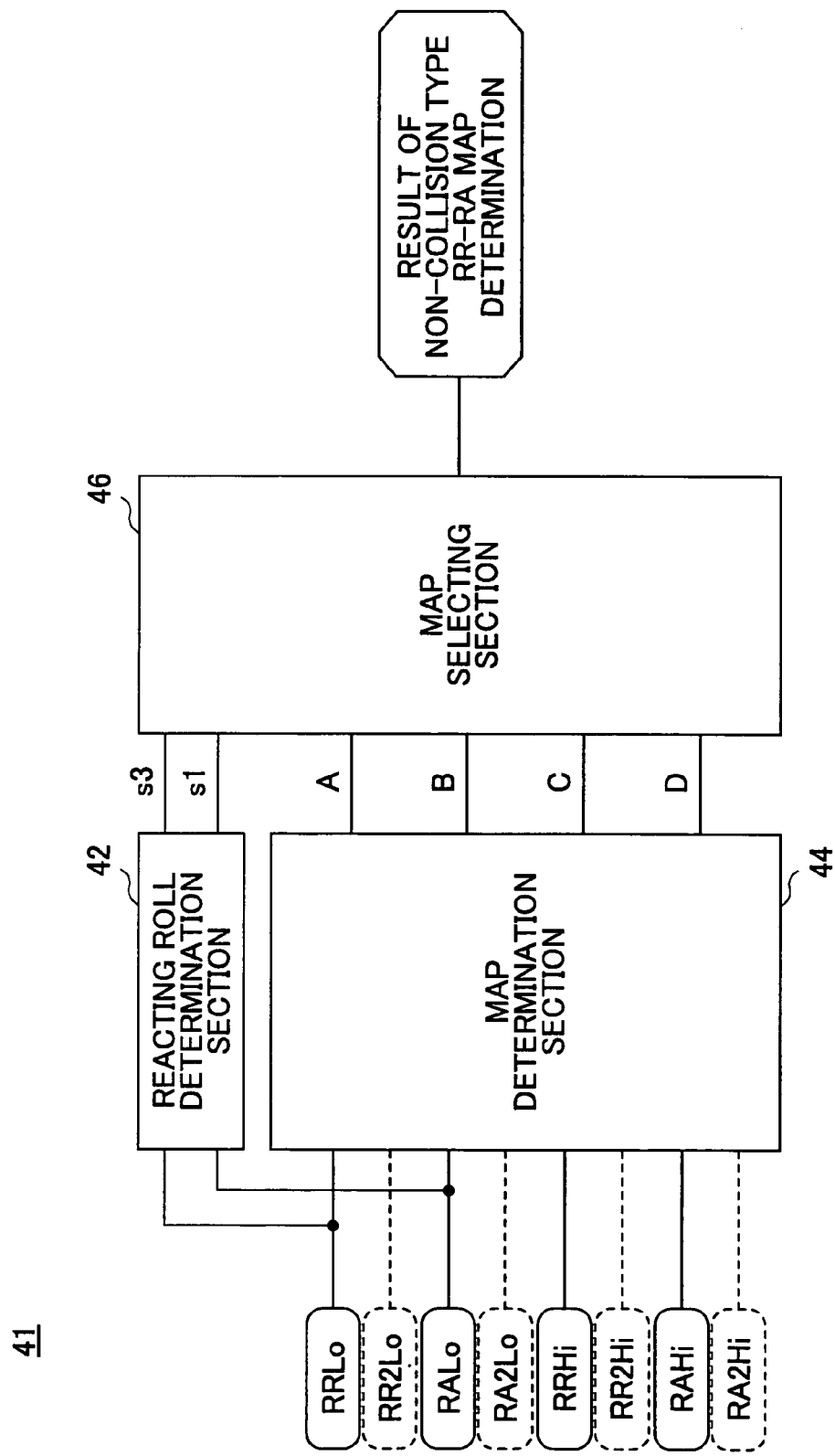
FIG. 5 is a block diagram of the non-collision type RR-RA map determination section 41.

FIG. 5 is a block diagram of the non-collision type RR-RA map determination section 41. The non-collision type RR-RA map determination section 41 is comprised of a reacting roll determination section 42, a map determination section 44, and a map selecting section 46.

The reacting roll determination section 42 determines whether a reacting roll phenomenon occurs. The reacting roll phenomenon is a phenomenon that occurs when the vehicle rolls largely in one direction but doesn't roll over, restores to its horizontal state and then rolls in an opposite direction in reaction to the roll phenomenon in one direction. The map determination section 44 outputs 4 types of map determination results (described below in detail) by using 2 types of RR-RA maps, that is, a collision type RR-RA map and a non-collision type RR-RA map. Among these map determination results the map selecting section 46 selects the map determination result that is to be used for the final determination for the ignition of the inflation of an airbag, for example.

Next, the reacting roll determination section 42, the map determination section 44 and the map selecting section 46 are described in detail step by step.

The reacting roll determination section 42 detects "a reacting roll phenomenon" if the following criteria are met.
(1) A roll angle RA exceeds a predetermined threshold TH_RA1S+ (positive value), that is, RA>TH_RA1S+;
(2) Following the event (1), the roll angle RA starts to decrease. That is to say, a roll rate RR falls below a predetermined threshold TH_RR1L− (negative value), that is, RR<TH_RR1L−; and
(3) A decreasing rate of the roll angle RA is larger than a predetermined rate. That is to say, a roll rate RR falls below a predetermined threshold TH_RR1H− (negative value), that is, RR<TH_RR1H−.

It is noted that the criteria (1), (2) and (3) are defined under the circumstance where the vehicle rolls in the direction in which a roll angle RA increases. Thus, under the circumstance where the vehicle rolls in the opposite direction, that is the direction in which a roll angle RA decreases, the criteria can be used by reversing polarities of the predetermined thresholds and inequality signs. It is noted that in both this specification and the accompanying drawings the symbols + and − affixed to the end of the reference symbols for the thresholds indicate the polarity of the thresholds.

It is noted that on an off-road (a bad road) there is a possibility that the vehicle rolls in one direction but doesn't roll over and restores to its horizontal state slowly. The criterion (3) is provided to prevent this phenomenon from being detected as "a reacting roll phenomenon".

Figure 6:
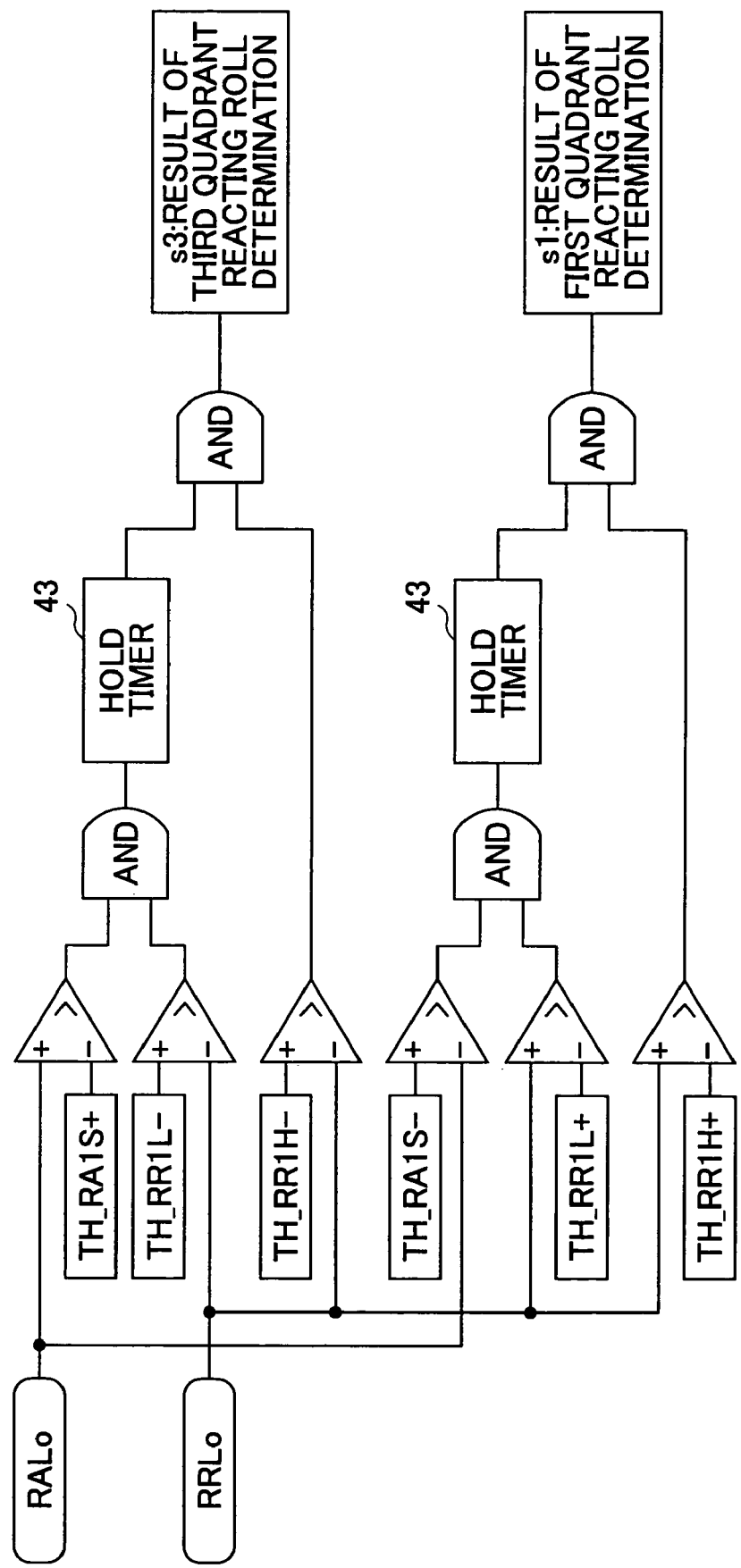
FIG. 6 is a block diagram of the determination process carried out by the reacting roll determination section 42.
Figure 7:
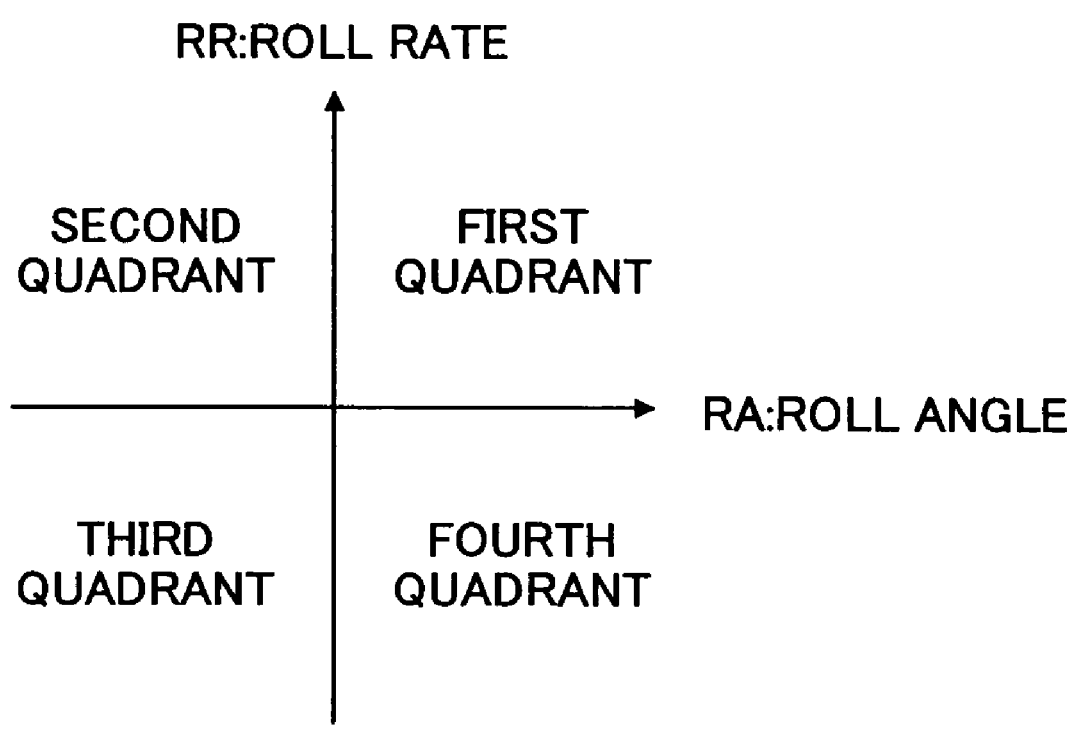
FIG. 7 is one example of a two-dimensional map defined by a vertical axis of a roll rate RR and a horizontal axis of a roll angle RA.

FIG. 6 is a block diagram of the determination process carried out by the reacting roll determination section 42. The reacting roll determination section 42 makes two types of reacting roll determinations corresponding to two roll directions, as shown in FIG. 6. Assuming the two-dimensional map defined by a vertical axis of a roll rate RR and a horizontal axis of a roll angle RA as shown in FIG. 7, the roll over determination is made in an upper right quadrant or a lower left quadrant (i.e., a quadrant where polarities of roll rate RR and roll angle RA are the same) according to the roll directions. In this embodiment, as described below in detail, the reacting roll determination section 42 makes two types of reacting roll determinations corresponding to two roll directions, and the respective reacting roll determination results are reflected in the roll over determinations in an upper right quadrant or a lower left quadrant. It is noted that, in both this specification and the accompanying drawings, "a first quadrant reacting roll determination" refers to the reacting roll determination that is to be reflected in the roll over determination in an upper right quadrant and "a third quadrant reacting roll determination" refers to the reacting roll determination that is to be reflected on the roll over determination in a lower left quadrant.

The first quadrant reacting roll determination and the third quadrant reacting roll determination are substantially the same due to their symmetrical relationship except that the polarities of the thresholds and inequality signs of the criteria (1), (2) and (3) are reversed. Therefore, only third quadrant reacting roll determination is described hereafter with reference to FIG. 8A and FIG. 8B.

Figure 8A:
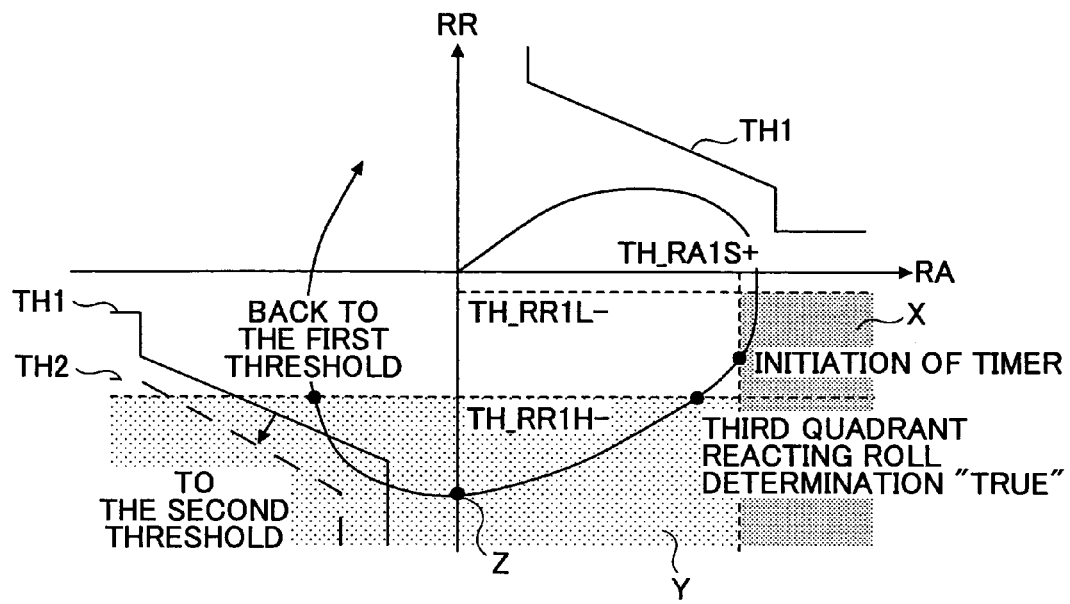
FIG. 8A and FIG. 8B are graphic diagrams for explaining an algorithm implemented by the reacting roll determination section 42 for detecting a reacting roll phenomenon.
Figure 8B:
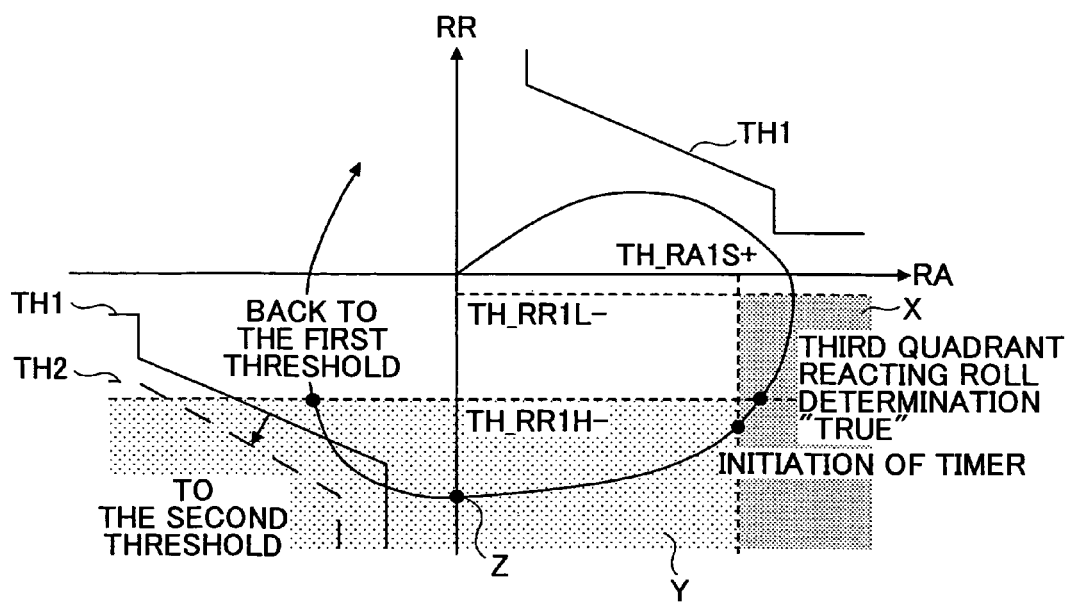

As shown by the curved line on the RR-RA map in FIG. 8A and FIG. 8B, when the vehicle starts to roll, a roll angle RA starts to increase and thus a roll rate RR increases in a positive direction, and after the vehicle rolls to its maximum level, a roll angle RA starts to decrease and thus a roll rate RR changes its polarity from a positive to a negative. It is noted that during this time period, if a relationship between the roll angle RA and the roll rate RR exceeds a roll over determination threshold TH1 as shown in FIG. 8A and FIG. 8B, the roll over phenomenon (in this example, a roll over phenomenon in the first quadrant) will be detected. If the roll over phenomenon doesn't occur, the reacting roll phenomenon initiates and thus the vehicle restores to its horizontal status indicated by a symbol Z on the curved line in FIG. 8A and FIG. 8B. During this period, the roll angle RA decreases at a relatively high rate (i.e., with a large absolute value of a roll rate RR).

The aforementioned respective criteria (1), (2) and (3) are defined so that the aforementioned characteristics of the relationship between a roll angle RA and a roll rate RR in the reacting roll phenomenon is taken into account. The area X defined by the criteria (1) and (2) and the area Y defined by the criterion (3) are shown in FIG. 8A and FIG. 8B.

Depending on the status of the road or the cause of the roll phenomenon, in some cases the criteria (1), (2) and (3) are met simultaneously as shown in FIG. 8B, and in other cases the criterion (3) is met within a certain time period after the criteria (1) and (2) are met as shown in FIG. 8A. In order to detect both cases of the reacting roll phenomenon, the reacting roll determination section 42 according this embodiment is provided with a hold timer 43 (see FIG. 6). Once the criteria (1) and (2) are met, the hold timer 43 holds the criteria (1) and (2) as being met for a certain duration of time T3sRR1 after the criteria (1) and (2) become not met. In other words, the hold timer 43 holds a logic "true" for a certain duration of time, even though the logic changes from "true" to "false", in order to validate a determination of the criterion (3) for a certain duration of time T3sRR1 after the criteria (1) and (2) become not met. In this way, the reacting roll determination section 42 according to this embodiment can detect "a reacting roll phenomenon" even in the case of such a curved line defined by a roll rate RR and a roll angle RA as shown in FIG. 8A.

It is noted that the concrete values of the aforementioned thresholds and durations of time for holding "true" (i.e., holding times T1sRR1 and T3sRR1 prepared for the first and the third quadrant reacting roll determinations, respectively) should be determined through the adaptation of certified tests.

Referring to FIG. 8A and FIG. 8B again, after the vehicle rolls in one direction and then restores to its horizontal state, the vehicle starts to roll in the opposite direction. During this period, if the relationship between the roll angle RA and the roll rate RR exceeds a roll over determination threshold TH1 as shown in FIG. 8A and FIG. 8B, the roll over phenomenon (in this example, a roll over phenomenon in the third quadrant) will be detected.

Figure 9A:
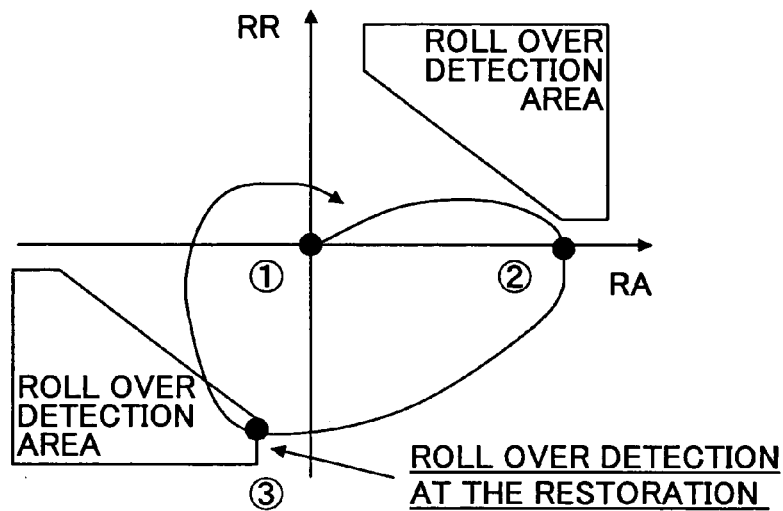
FIGS. 9A-9C are graphic diagrams for explaining states of a vehicle associated with a relation between a roll rate RR and a roll angle RA.
Figure 9B:
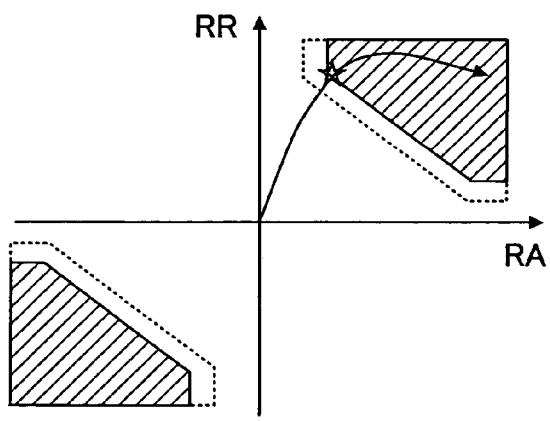
Figure 9C:
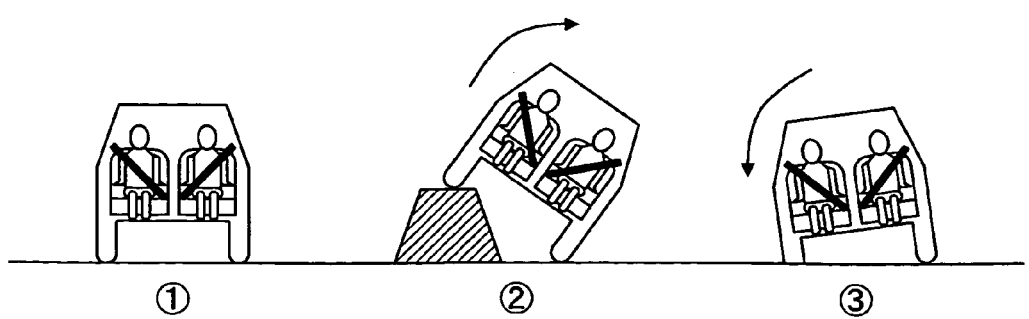

By the way, as is apparent from FIG. 8A and FIG. 8B, the vehicle starts to roll in the opposite direction with a relatively high roll rate RR (i.e., with a large absolute values of a roll rate RR) at the beginning of the reacting roll phenomenon. Thus, in the case of the roll over determination thresholds TH1 based on the relationship between roll angle RA and roll rate RR being set symmetrically, the roll over detection is more likely to be established for the reacting roll phenomenon, as shown in FIG. 9A. It is possible to set the roll over determination thresholds TH1 high enough in order to avoid this roll over detection. However, this solution leads a delay in roll over detection (i.e., a roll over phenomenon cannot be detected within a required time) under such a circumstance where the vehicle suddenly starts to roll from its horizontal state to roll over. It is noted that the states of the vehicle corresponding to the respective points in FIG. 9A and FIG. 9B are shown in FIG. 9C.

To address this problem, in this embodiment, as described below in detail, the roll over determination threshold TH1 is changed to a less sensitive threshold TH2 (indicated by broken lines in the third quadrant of FIG. 8) when the "reacting roll phenomenon" is detected by the reacting roll determination section 42. According to this solution, it is possible to effectively prevent the roll over detection for the reacting roll phenomenon while preventing a delay in roll over detection for the over roll phenomenon.

Here, to make the threshold "less sensitive" means to make a roll over determination threshold TH1 for the first quadrant reacting roll determination larger and make a roll over determination threshold TH1 for the third quadrant reacting roll determination smaller.

It is noted that in this embodiment the roll over determination threshold TH1 is defined by lines intersecting at an angle so that a roll over detection is established when a roll angle RA increases (or decreases) with a high roll rate RR and a roll angle RA increases (or decreases) to exceed (fall below) a predetermined upper limit (a lower limit). However, the present invention is not limited to this example and is applicable to any kinds of thresholds suited for detecting an excessive roll state of the vehicle. Further, the changed threshold TH2 is not necessarily obtained by offsetting the roll over determination threshold TH1 in a predetermined direction. That is to say, the threshold TH2 may be assigned any values as long as it is less sensitive than the roll over determination threshold TH1. Furthermore, the roll over determination thresholds TH1 in the first and the third quadrants as well as the changed thresholds TH2 in the first and the third quadrants are not necessarily symmetric as shown.

The reacting roll determination section 42 make the reacting roll determinations in the first the third quadrants simultaneously as mentioned above and outputs the determination results s3 and s1 indicated in FIG. 6.

It is noted that if the criteria (1), (2) and (3) are met as mentioned above, a logic "true" is output as a determination result and this determination result is held until the aforementioned holding time T3sRR1 (T1sRR1) expires and the criteria (1), (2) become not met. Alternatively, the determination result is held until the criterion (3) finally becomes not met. That is to say, if the criteria (1), (2) and (3) are met as mentioned above, the roll over determination threshold TH1 is changed to the threshold TH2 and then changed back to the roll over determination threshold TH1 when the holding time T3sRR1 (T1sRR1) expires or the criterion (3) finally becomes not met. In any case, the changed threshold TH2 may be changed back to the roll over determination threshold TH1 step by step, that is via an intermediate threshold (not shown) between TH1 and TH2, considering other factors such as an elapsed time.

Next, the operations of the map determination section 44 and the map selecting section 46 which change the roll over determination threshold TH1 in accordance with the aforementioned determination result by the reacting roll determination section 42 are described in detail.

Figure 10:
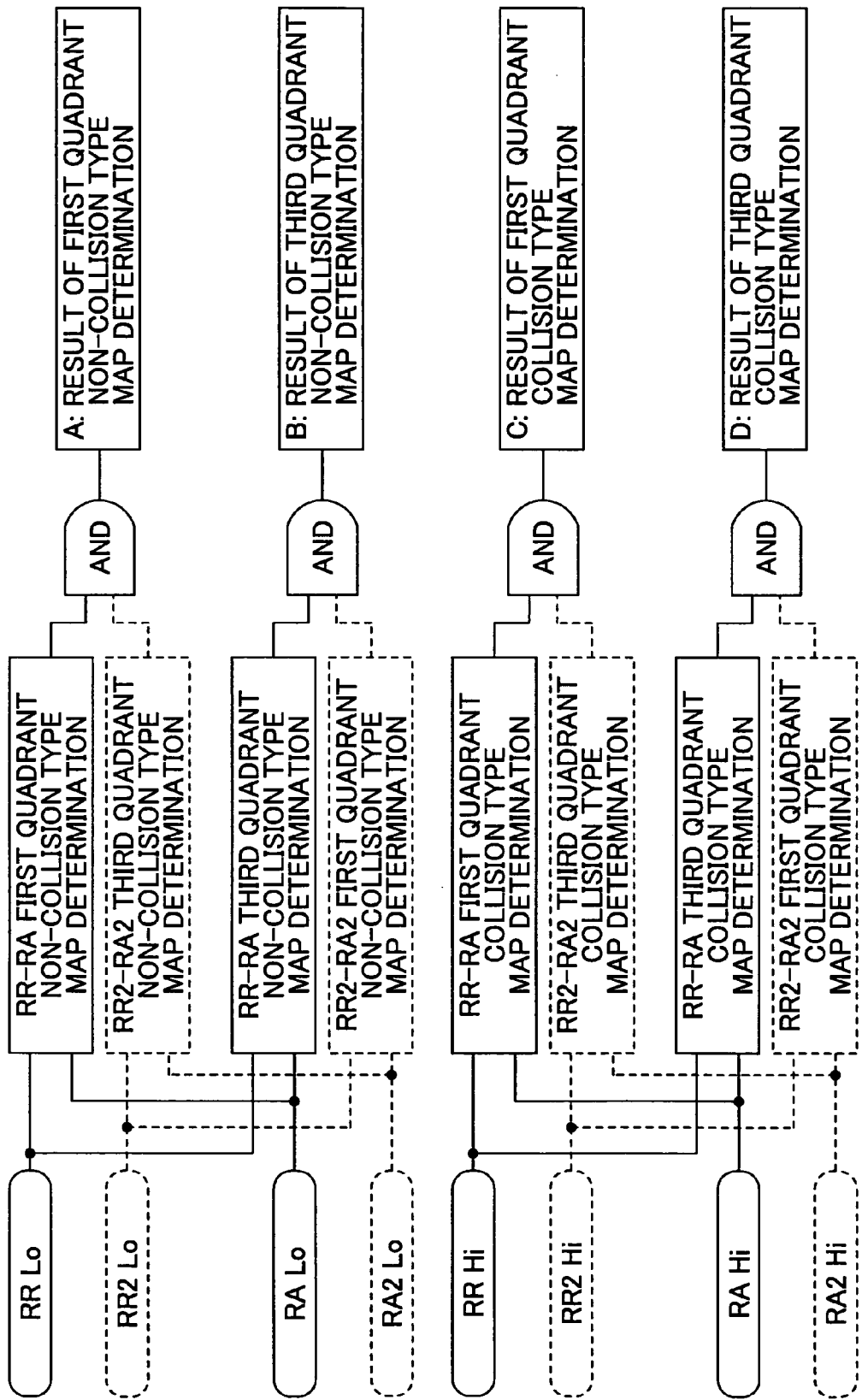
FIG. 10 is a control block diagram of the map determination section 44.

FIG. 10 is a control block diagram of the map determination section 44. The map determination section 44 makes the determination whether the roll over phenomenon is detected using the two types of RR-RA maps (i.e., collision and non-collision type RR-RA maps). At this time, the map determination section 44 makes the aforementioned determinations in both the first and the third quadrants for the respective RR-RA maps. As a result, the four types of determinations are made separately by the map determination section 44.

Concerning terminology as to these types of determinations, "RR-RA first quadrant non-collision type map determination" refers to the determination in the first quadrant using a non-collision type RR-RA map, "RR-RA first quadrant collision type map determination" refers to the determination in the first quadrant using a collision type RR-RA map, and so on.

Here, the collision type RR-RA map is used for detecting the roll phenomenon involving a collision (for example, a collision of a wheel of the vehicle with a curbstone of the roadway as a result of the vehicle having slid sideways, and the like) and thus the roll over determination thresholds of the collision type RR-RA map are less sensitive than those of the non-collision type RR-RA map. Therefore, in this embodiment, the collision type RR-RA map is used as a map in which the roll over determination threshold TH2 is defined, and the non-collision type RR-RA map is used as a map in which the roll over determination threshold TH1 is defined.

The map determination section 44, shown in FIG. 10, simultaneously carries out the four types of roll over determinations as a whole by selectively using the respective calculated values RRLo, RRHi, RALo, RAHi according to the respective maps. For example, the map determination section 44 determines whether a plotted point defined by a roll angle RALo and a roll rate RRLo exceeds the roll over determination threshold TH1 on the non-collision type RR-RA map. If the plotted point is located in the first quadrant, the determination result in the third quadrant is "false" as a matter of fact and this determination result is output (see B in FIG. 10). On the other hand, if the plotted point exceeds the roll over determination threshold TH1 in the first quadrant, the determination result in the third quadrant is "true" and this determination result is output (see A in FIG. 10). The four determination results derived in this way (i.e., the outputs A-D shown in FIG. 10) are supplied to the map selecting section 46 together with the determination results for the reacting roll phenomenon output from the reacting roll determination section 42 (i.e., the outputs s3 and s1 shown in FIG. 6).

Figures 11, 12:
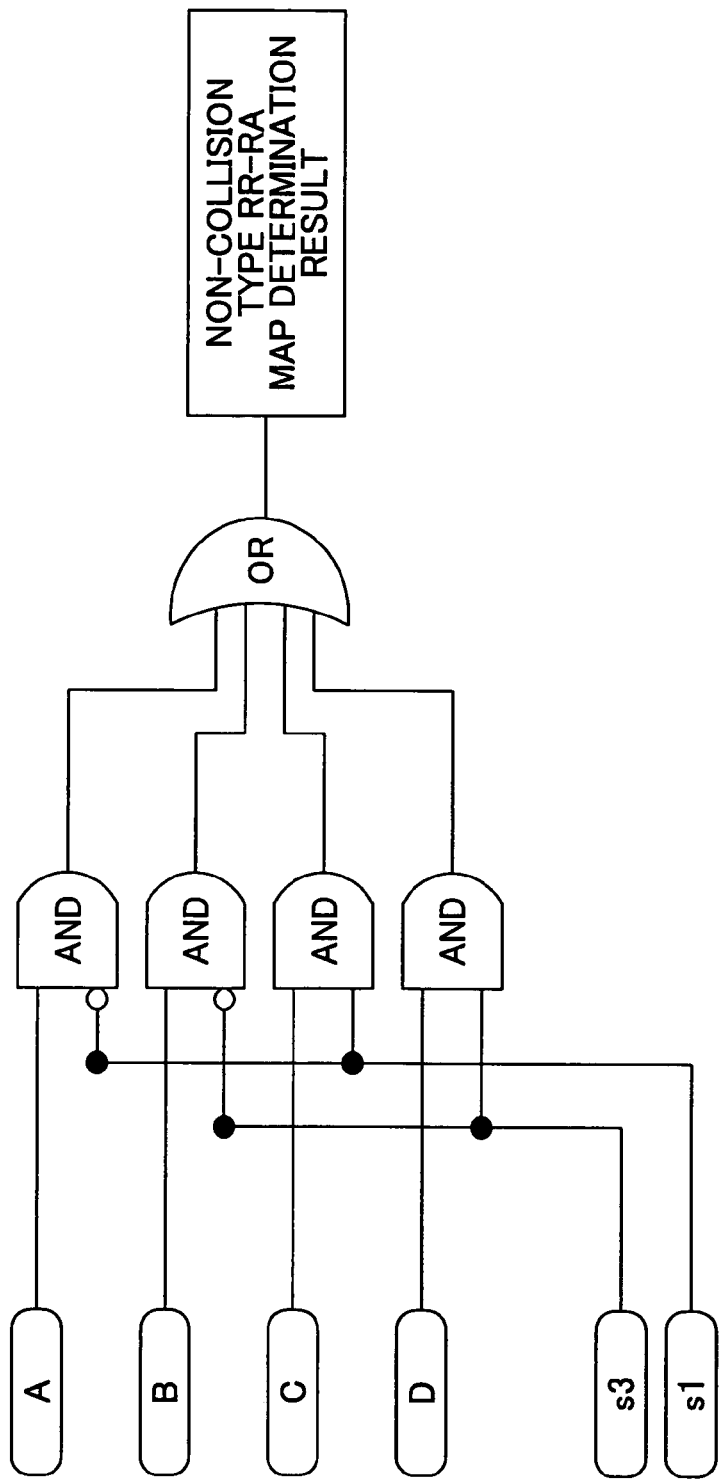
FIG. 11 is a selecting formula table that the map selecting section 46 follows.
FIG. 12 is a control block diagram of the map selecting section 46.

FIG. 12 is a control block diagram of the map selecting section 46 according to a formula shown in FIG. 11. The map selecting section 46 selects (validates) the appropriate roll over determination results, according to a formula shown in FIG. 11, based on the reacting roll determination results from the reacting roll determination section 42.

For example, as shown in FIG. 11 and FIG. 12, if the reacting roll determination results in the first and the third quadrants (i.e., the outputs s3 and s1) are "false" (i.e., no detection of the reacting roll phenomenon), the roll over determination results in the first and the third quadrants of the non-collision type RR-RA map (i.e., the outputs A and B) are selected. In this example, if any one of the selected roll over determination results is "true", logic "true" is output as a final determination result of the non-collision type RR-RA map.

As another example, if the reacting roll determination result in the first quadrant (i.e., the output s1) is "false" and the reacting roll determination results in the third quadrant (i.e., the output s3) is "true", the roll over determination result in the first quadrant of the non-collision type RR-RA map (i.e., the output A) and the roll over determination result in the third quadrant of the collision type RR-RA map (i.e., the output D) are selected. In this example, if the selected roll over determination results are all "false", logic "false" is output as a final determination result of the non-collision type RR-RA map. Therefore, in this case, even if the roll over determination result in the third quadrant of the non-collision type RR-RA map is "true", logic "false" is output as a final determination result.

It is noted that there may be such a case where the reacting roll determination results in the third quadrant (i.e., the output s3) has changed from "true" to "false" and then the reacting roll determination results in the first quadrant (i.e., the output s1) has changed from "false" to "true" (i.e., the secondary reacting roll phenomenon in reaction to the first reacting roll phenomenon is subsequently detected). Accordingly, the roll over determination result of the collision type RR-RA map to be selected is the determination result in the third quadrant, followed by the determination result in the first quadrant.

It is noted that the outputs of the map selecting section 46 output as mentioned above are used to make a final determination whether the passenger safety devices 22 such as a curtain shield airbag device should be activated, depending on the determination result of whether the collision involving relatively high acceleration occurs, as shown in FIG. 4. Thus, if the output of the map selecting section 46 is "true" and the collision determination result is "false", the passenger safety devices 22 such as a curtain shield airbag device will be activated.

As discussed above, according to this embodiment, by reflecting the reacting roll determination results of the reacting roll determination section 42 in the respective determination results of the map determination section 44, it becomes possible to obtain the roll over determination results in consideration of the reacting roll phenomenon. In other words, according to this embodiment, it becomes possible to prevent the roll over detection for the reacting roll phenomenon by selecting the roll over determination result of the collision type RR-RA map, while insuring roll over detection without a delay for a roll over phenomenon other than the reacting roll phenomenon by selecting the roll over determination result of the non-collision type RR-RA map.

The present invention is disclosed with reference to the preferred embodiments. However, it should be understood that the present invention is not limited to the above-described embodiments, and variations and modifications may be made without departing from the scope of the present invention.

For example, in the above-described embodiments, the roll over determination threshold of the collision type RR-RA map is to be used for detecting the roll over phenomenon in the case of the reacting roll phenomenon being detected; however, it is also possible to prepare separate RR-RA maps for detecting the roll over phenomenon at the detection of the reacting roll phenomenon.

Further, in the above-described embodiments, the four types of calculated values RRLo, RRHi, RALo, RAHi are derived from a roll rate sensor 16; however, it is also possible to provide a separate roll rate sensor 16a (see FIG. 1) to insure redundancy against a noise or a failure and thus calculate similar four types of values RR2Lo, RR2Hi, RA2Lo, RA2Hi. In this case, the roll rate sensor 16a may be configured to provide an output signal rr2 whose polarity is opposite to the polarity of the roll rate sensor 16. Further, each of the four types of calculated values (i.e., RR2Lo, RR2Hi, RA2Lo and RA2Hi) may be used for the above-mentioned determination in the same manner as (or in cooperation with) the four types of calculated values of the roll rate sensor 16. This reduces the susceptibility of the determination results to noise or failure of the roll rate sensors and the like. It is noted that the processing procedures of the calculated values of the roll rate sensor 16a in cooperation with the calculated values of the roll rate sensor 16 are shown by dotted lines in FIGS. 2, 3, 4, 5, 10, etc.

Further, in the above-described embodiments, non-collision type calculated values, that is, a roll angle RALo and a roll rate RRLo are used for the reacting roll determination; however, it is also possible to use collision type calculated values RAHi and RRHi, the other values (i.e., RR2Lo, RR2Hi, RA2Lo and RA2Hi) derived from the roll rate sensor 16a for redundancy, or any combination of a roll angle and a roll rate selected from these calculated values including RALo and RRLo.

Further, in the above-described embodiments, a relationship between a roll angle and a roll rate is used for the reacting roll determination; however, it is also possible to use other physical quantities, such as a parameter equivalent to a roll angle, a lateral acceleration, a double integral or a derivative value of a roll rate, instead of a roll angle.

Further, in the above-described embodiments, the reacting roll detection is established when the aforementioned criteria (1), (2) and (3) are met; however, the reacting roll detection may be established under one of the following circumstances (a)-(d):

(a) A decreasing rate of a roll angle exceeds a certain rate (i.e., criterion (3)) within a predetermined time after the roll angle having exceeded a certain angle (i.e., criterion (1));

(b) A roll angle exceeds a certain angle (i.e., criterion (1)) and then a roll angle falls below the certain angle;

(c) A roll angle exceeds a certain angle (i.e., criterion (1)) and then a polarity of a roll rate becomes negative (or falls below a certain negative value); and (d) A relationship between a roll angle and a roll rate doesn't exceed the roll over determination threshold TH1 within a certain time after having exceeded a separate threshold TH3 (not shown) less sensitive than the roll over determination threshold TH1. It is noted that the above discussion relates to the third quadrant reacting roll determination but the same goes for the first quadrant reacting roll determination by reversing polarities of the predetermined thresholds and inequality signs as mentioned above.

Further, in the above-described embodiments, if the result of the third quadrant reacting roll determination is "true", the roll over determination threshold TH1 in the third quadrant is set less sensitive, and if the result of the first quadrant reacting roll determination is "true", the roll over determination threshold TH1 in the first quadrant is set less sensitive. However, it is also possible to set the roll over determination thresholds TH1 in the first and third quadrants less sensitive if any one of the first and the third quadrant reacting roll determinations is "true".

Further, in the above-described embodiments, the roll over determination by way of the non-collision type RR-RA map is reflected by the result of the reacting roll determination; however, the roll over determination by way of the collision type RR-RA map, the non-collision type RR-GY map or the collision type RR-GY map can be reflected by the result of the reacting roll determination.

Further, in the above-described embodiments, the roll over determination threshold TH1 is changed to less sensitive threshold TH2 if the reacting roll phenomenon is detected. However, it is also possible to prevent the roll over detection from being made if the reacting roll phenomenon is detected, since the probability of the roll over phenomenon occurring along with the reacting roll phenomenon is low in fact. In this arrangement, the roll over detection in the third quadrant may be masked if the result of the third quadrant reacting roll determination is "true", and the roll over detection in the third quadrant may be masked if the result of the third quadrant reacting roll determination is "true". Alternatively, it is also possible to mask the roll over detection in the first and third quadrants for a predetermined time if any one of the first and the third quadrant reacting roll determinations is "true". In any case, the criteria for canceling the masking state may be the same as the criteria for returning the roll over determination threshold TH2 to the threshold TH1.

Further, in the above-described embodiments, the roll over detection is based on a relationship between a roll angle and a roll rate or a relationship between a roll rate and a lateral acceleration. However, the roll over detection may be based on any physical quantities representative of a roll state of the vehicle. Further, the roll over detection may be based on one of a roll angle, a roll rate and a lateral acceleration, all of them or any combination of two of them. In any case, the aforementioned roll over determination threshold TH1, TH2 and the like are defined by the corresponding physical quantities used for roll over detection.

The invention claimed is:

1. A roll over detector for a vehicle, comprising:
a roll over phenomenon detecting circuit that detects a roll over phenomenon of the vehicle based on a relationship between at least a type of physical quantity representative of a roll state of the vehicle and a predetermined threshold;
a reacting roll phenomenon detecting circuit that detects a reacting roll phenomenon of the vehicle based on a predetermined criterion, which reacting roll phenomenon occurs in reaction to a roll phenomenon in an opposite direction; and
a threshold changing circuit that changes the predetermined threshold from a first threshold to a second threshold if the reacting roll phenomenon is detected by the reacting roll phenomenon detecting circuit.

2. The roll over detector as claimed in claim 1, wherein the detection by the roll over phenomenon detecting circuit is based on the predetermined thresholds prepared for each direction in which the vehicle rolls, and the threshold changing circuit changes the predetermined threshold corresponding to a restoring direction in which the reacting roll phenomenon is detected to occur.

3. The roll over detector as claimed in claim 2, wherein the threshold changing circuit further changes the predetermined threshold corresponding to the other direction opposite to the restoring direction.

4. The roll over detector as claimed in claim 1, wherein the threshold changing circuit changes the predetermined threshold so that the roll over phenomenon becomes difficult to be detected by the roll over phenomenon detecting circuit.

5. The roll over detector as claimed in claim 1, wherein the reacting roll phenomenon detecting circuit detects the reacting roll phenomenon based on at least a roll rate.

6. The roll over detector as claimed in claim 5, wherein the reacting roll phenomenon detecting circuit detects the reacting roll phenomenon based on at least said roll rate and a roll angle.

7. The roll over detector as claimed in claim 1, wherein the reacting roll phenomenon detecting circuit detects the reacting roll phenomenon if an absolute value of a roll angle exceeds a certain value and then falls below the certain value.

8. The roll over detector as claimed in claim 1, wherein the reacting roll phenomenon detecting circuit detects the reacting roll phenomenon if an absolute value of a roll angle exceeds a certain value and then a polarity of a roll rate reverses.

9. The roll over detector as claimed in claim 1, wherein the reacting roll phenomenon detecting circuit detects the reacting roll phenomenon if a polarity of a roll rate reverses and then an absolute value of the roll rate exceeds a certain value.

10. The roll over detector as claimed in claim 1, wherein the reacting roll phenomenon detecting circuit detects the reacting roll phenomenon if an absolute value of a roll angle exceeds a certain value and then falls below the certain value, and the threshold changing circuit further changes the predetermined threshold, which has been changed to the second threshold, in a direction toward the first threshold after the expiration of a predetermined time interval which starts at the time when the absolute value of the roll angle falls below the certain value.

11. The roll over detector as claimed in claim 1, wherein the reacting roll phenomenon detecting circuit detects the reacting roll phenomenon if an absolute value of a roll angle exceeds a first predetermined value, a polarity of a roll rate reverses and then an absolute value of the roll rate exceeds a second predetermined value, and the threshold changing circuit further changes the predetermined threshold, which has been changed to the second threshold, in a direction toward the first threshold when the absolute value of the roll rate falls below the second predetermined value.

12. A roll over detector for a vehicle, comprising:
a roll over phenomenon detecting circuit that detects a roll over phenomenon of the vehicle based on a relationship between at least a type of physical quantity representative of a roll state of the vehicle and a predetermined threshold;
a reacting roll phenomenon detecting circuit that detects a reacting roll phenomenon of the vehicle based on a predetermined criterion, which reacting roll phenomenon occurs in reaction to a roll phenomenon in an opposite direction; and
a prohibition circuit that prevents the roll over phenomenon from being detected in a restoring direction if the reacting roll phenomenon is detected by the reacting roll phenomenon detecting circuit.

13. The roll over detector as claimed in claim 12, wherein the prohibition circuit further prevents the roll over phenomenon from being detected in the other direction opposite to the restoring direction.

14. The roll over detector as claimed in claim 12, wherein the reacting roll phenomenon detecting circuit detects the reacting roll phenomenon based on at least a roll rate.

15. The roll over detector as claimed in claim 14, wherein the reacting roll phenomenon detecting circuit detects the reacting roll phenomenon based on at least said roll rate and a roll angle.

16. The roll over detector as claimed in claim 12, wherein the reacting roll phenomenon detecting circuit detects the reacting roll phenomenon if an absolute value of a roll angle exceeds a certain value and then falls below the certain value.

17. The roll over detector as claimed in claim 12, wherein the reacting roll phenomenon detecting circuit detects the reacting roll phenomenon if an absolute value of a roll angle exceeds a certain value and then a polarity of a roll rate reverses.

18. The roll over detector as claimed in claim 12, wherein the reacting roll phenomenon detecting circuit detects the reacting roll phenomenon if a polarity of a roll rate reverses and then an absolute value of the roll rate exceeds a certain value.

* * * * *